June 30, 1959 J. P. ECKERT, JR., ET AL 2,892,998

SIGNAL TRANSLATING DEVICE

Filed Sept. 24, 1953 15 Sheets-Sheet 1

INVENTORS
JOHN PRESPER ECKERT, JR.
THEODORE H. BONN

George V. Eltgroth

ATTORNEY

June 30, 1959 J. P. ECKERT, JR., ET AL 2,892,998

SIGNAL TRANSLATING DEVICE

Filed Sept. 24, 1953 15 Sheets-Sheet 2

INVENTORS
JOHN PRESPER ECKERT, JR.
THEODORE H. BONN

ATTORNEY

SIGNAL TRANSLATING DEVICE

Filed Sept. 24, 1953 15 Sheets-Sheet 3

INVENTORS
JOHN PRESPER ECKERT, JR.
THEODORE H. BONN
George V. Eltgroth
ATTORNEY

SIGNAL TRANSLATING DEVICE

Filed Sept. 24, 1953 15 Sheets-Sheet 4

*INVENTORS*
JOHN PRESPER ECKERT, JR.
THEODORE H. BONN

George V. Eltgroth
*ATTORNEY*

June 30, 1959 J. P. ECKERT, JR., ET AL 2,892,998

SIGNAL TRANSLATING DEVICE

Filed Sept. 24, 1953 15 Sheets-Sheet 5

INVENTORS
JOHN PRESPER ECKERT, JR.
THEODORE H. BONN

ATTORNEY

*INVENTORS*
JOHN PRESPER ECKERT, JR.
THEODORE H. BONN
George V. Eltgroth
*ATTORNEY*

INVENTORS
JOHN PRESPER ECKERT, JR.
THEODORE H. BONN
George V. Eltgroth
ATTORNEY

INVENTORS
JOHN PRESPER ECKERT, JR.
THEODORE H. BONN
George V. Eltgroth
ATTORNEY

INVENTORS
JOHN PRESPER ECKERT, JR.
THEODORE H. BONN
George V. Eltgroth
ATTORNEY

June 30, 1959 J. P. ECKERT, JR., ET AL 2,892,998
SIGNAL TRANSLATING DEVICE
Filed Sept. 24, 1953 15 Sheets-Sheet 10

INVENTORS
JOHN PRESPER ECKERT, JR.
THEODORE H. BONN

ATTORNEY

June 30, 1959 J. P. ECKERT, JR., ET AL 2,892,998

SIGNAL TRANSLATING DEVICE

Filed Sept. 24, 1953 15 Sheets-Sheet 11

INVENTORS
JOHN PRESPER ECKERT, JR.
THEODORE H. BONN

George V. Eltgroth
ATTORNEY

June 30, 1959 J. P. ECKERT, JR., ET AL 2,892,998

SIGNAL TRANSLATING DEVICE

Filed Sept. 24, 1953 15 Sheets-Sheet 12

INVENTORS
JOHN PRESPER ECKERT, JR.
THEODORE H. BONN

George V. Ellgroth

ATTORNEY

INVENTORS
JOHN PRESPER ECKERT, JR.
THEODORE H. BONN
George V. Eltgroth
ATTORNEY

INVENTORS
JOHN PRESPER ECKERT, JR.
THEODORE H. BONN
George V. Eltgroth
ATTORNEY

June 30, 1959 J. P. ECKERT, JR., ET AL 2,892,998

SIGNAL TRANSLATING DEVICE

Filed Sept. 24, 1953 15 Sheets-Sheet 15

INVENTORS
JOHN PRESPER ECKERT, JR
THEODORE H. BONN

George V. Eltgroth
ATTORNEY.

United States Patent Office 2,892,998

Patented June 30, 1959

2,892,998

SIGNAL TRANSLATING DEVICE

John Presper Eckert, Jr., Gladwyne, and Theodore H. Bonn, Philadelphia, Pa., assignors to Sperry Rand Corporation, a corporation of Delaware Application September 24, 1953, Serial No. 382,180

36 Claims. (Cl. 340—174)

This invention relates to magnetic devices and more particularly to devices utilizing magnetic phenomena for producing signal controlled outputs and to logical circuits for the use thereof.

In the operation of electronic computing equipment and the like, operating at extremely high speeds, amplifiers are used to perform various logical functions. Electron tubes employing the valving action of a charged grid on an electron stream have been satisfactorily used for amplification purposes. However, a disadvantage in the use of electron tubes is the rather limited life thereof due to failure of such tubes and the fragile construction thereof. It has been proposed to replace the electron tube amplifier elements by solid-state elements that will not be subjected to the limited life defects of electron tubes.

Ferromagnetic materials may be employed in such amplifying apparatus. They exhibit a hysteresis loop and display a high impedance when operating over the portion of the loop from minus residual flux density to plus residual flux density and show a low impedance when traveling from plus residual flux density towards plus saturation flux density. Use can be made of these effects for signal translating and amplifying purposes. A way of using this effect is to produce the desired output when and while the core occupies the high impedance portion of its hysteresis loop. The present invention covers devices using this effect and which may be conveniently referred to as "parallel" signal translating or amplifying devices.

With working frequencies in the megacycle region, many problems are encountered. They may deal, for example, with the speed with which a material can traverse its hysteresis loop, with the transmission of unwanted energy to the input circuits and with the generation of spurious outputs.

It is, therefore, a primary object of the invention to provide a novel magnetic apparatus.

Another object of the invention is to provide a novel signal translating apparatus operating in parallel.

An additional object of the invention is to provide a novel signal translating apparatus which will operate successfully at high frequencies.

A further object of the invention is to provide a novel signal translating apparatus employing magnetic phenomena.

Another object of the invention is to provide a novel signal translating apparatus having an efficient and fast operating signal input arrangement.

An added object of the invention is to provide a novel signal translating apparatus having an improved output arrangement to suppress unwanted outputs.

Still another object of the invention is to provide a novel signal translating apparatus utilizing only one coil on a core of ferromagnetic material.

Another object of the invention is to provide a novel signal translating apparatus having a short rise time.

Yet another object of the invention is to provide a novel signal translating apparatus having an output constant in amplitude and duration.

A further object of the invention is to provide a novel signal translating apparatus to be useful as a means for multiplying the rate of transmission of information through a single channel.

An added object of the invention is to provide a novel flip-flop circuit utilizing magnetic phenomena.

Another object of the invention is to provide a novel delay-flop circuit utilizing magnetic phenomena.

Still another object of the invention is to provide a novel frequency divider circuit utilizing magnetic phenomena.

A further object of the invention is to provide a novel shifting register utilizing magnetic phenomena.

Another object of the invention is to provide a novel pulse time delay circuit utilizing magnetic phenomena.

An added object of the invention is to provide a novel delay circuit for pulse envelope signals.

Other objects and advantages of the invention will become apparent from the following description and the accompanying drawings in which.

Figure 2A:
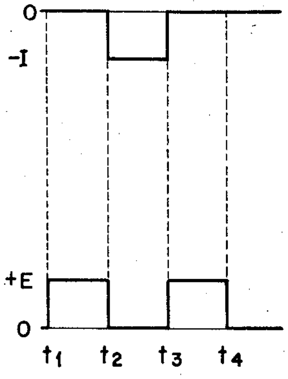
Figure 2 shows a basic circuit of a solid-state signal translating device.
Figure 2:
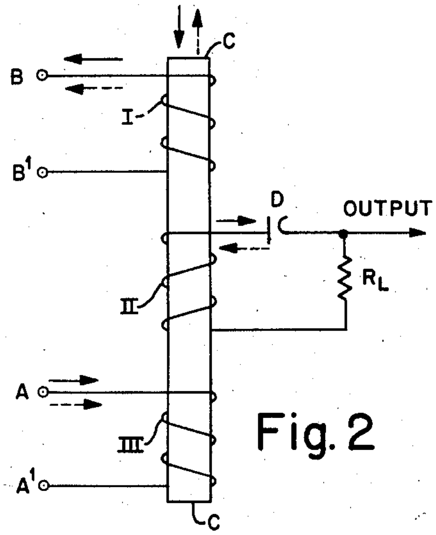
Figure 3:
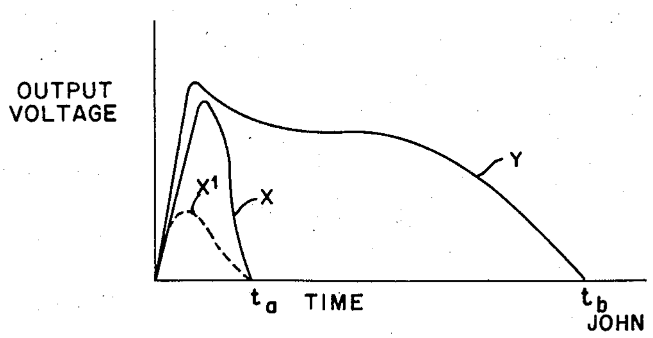
Figure 4:
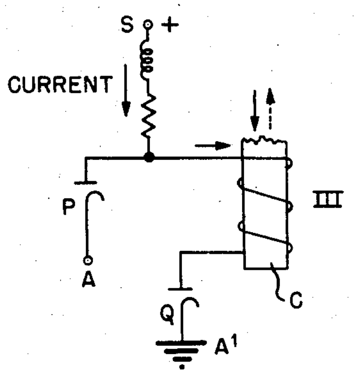
Figure 5:
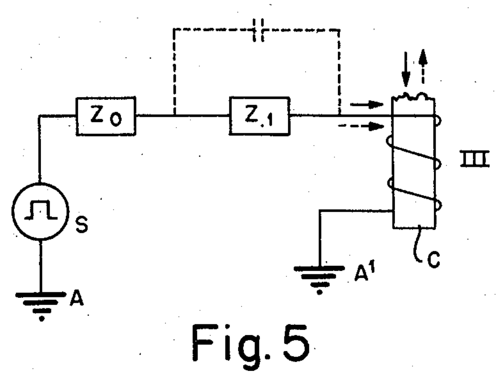
Figure 6:
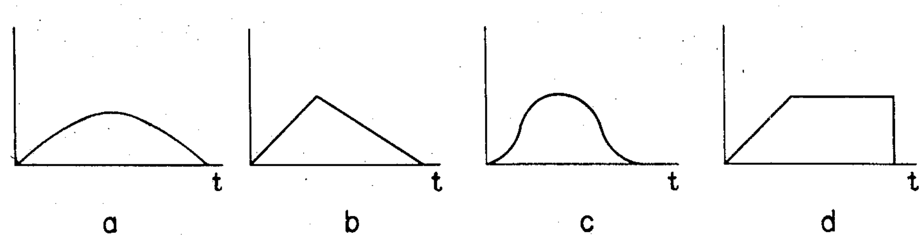
Figure 7:
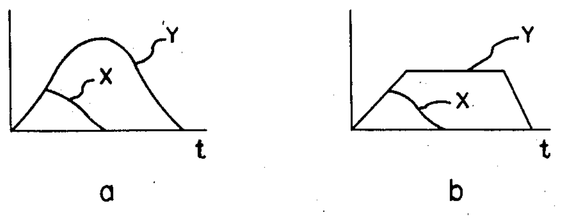
Figure 8:
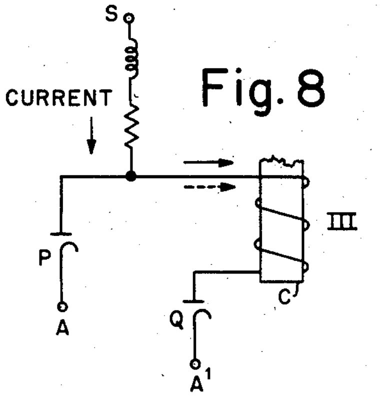
Figure 9:
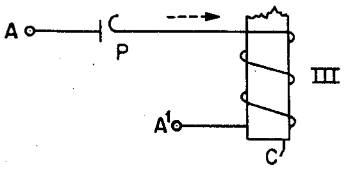
Figure 9A:
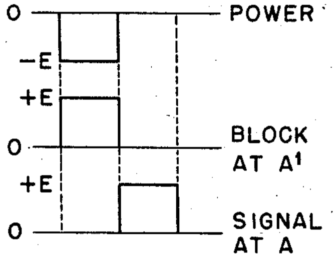
Figures 8A, 8B, 8C:
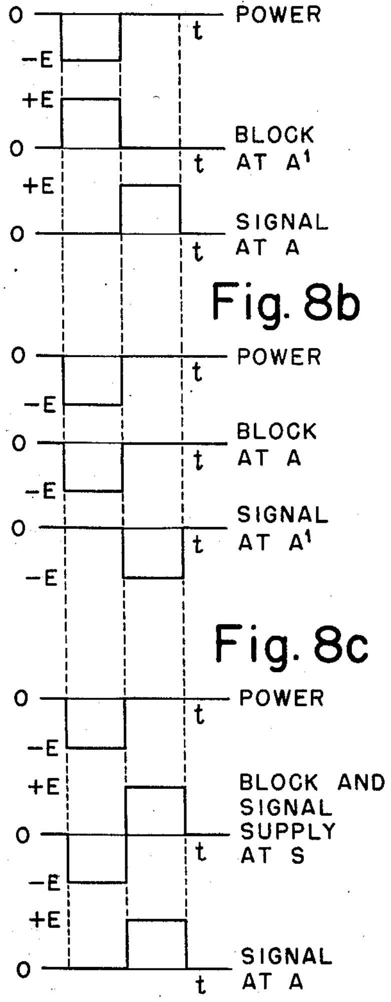
Figure 10:
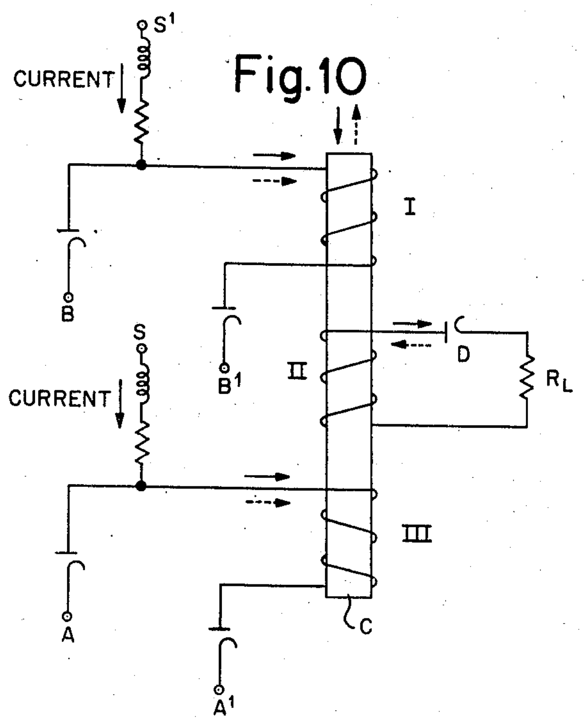
Figure 10A:
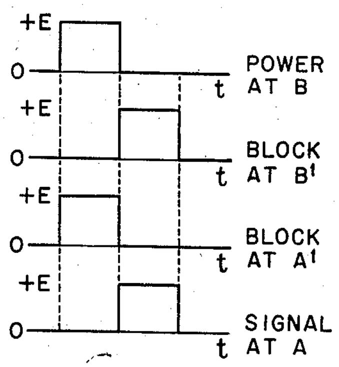
Figure 11:
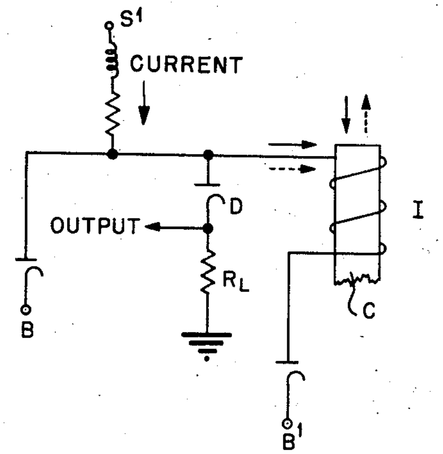
Figure 11A:
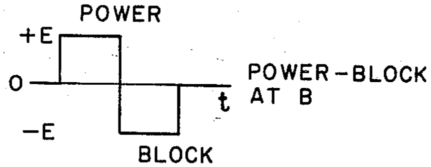
Figure 12:
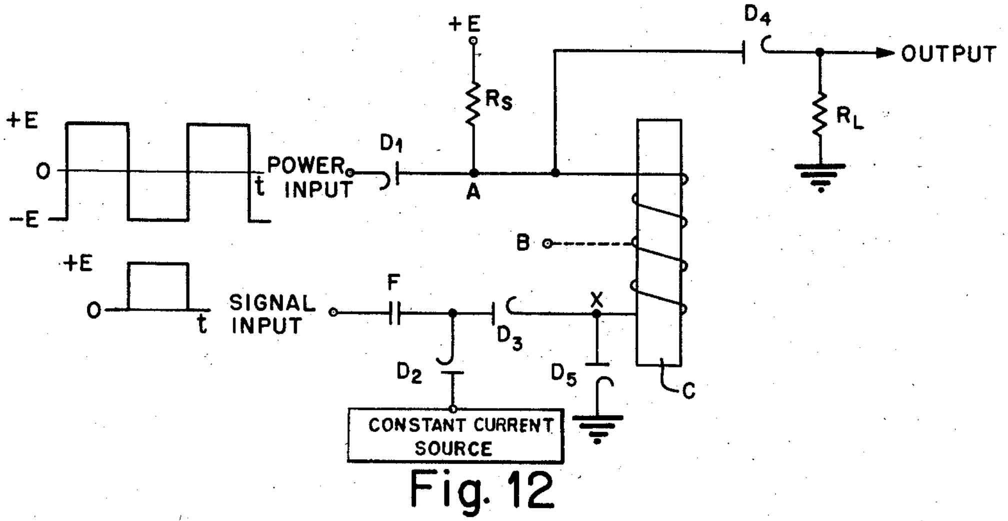
Figure 13:
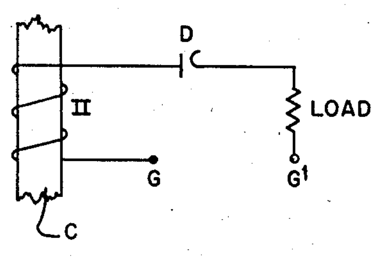
Figure 13A:
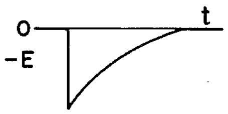
Figure 14:
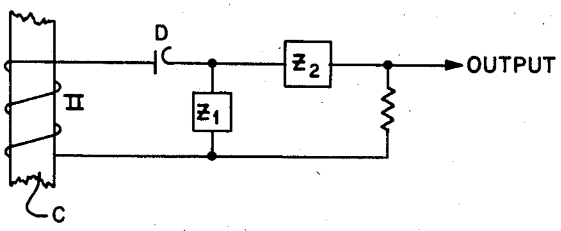
Figure 15:
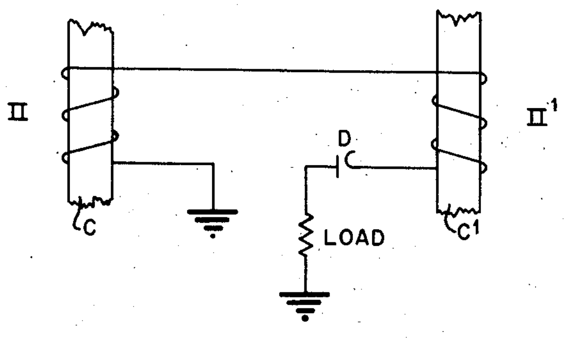
Figure 16:
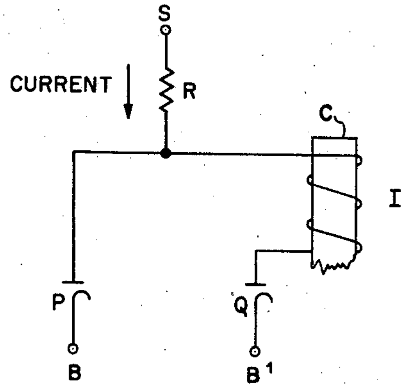
Figure 16A:
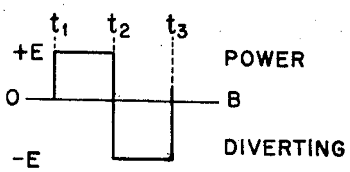
Figure 17:
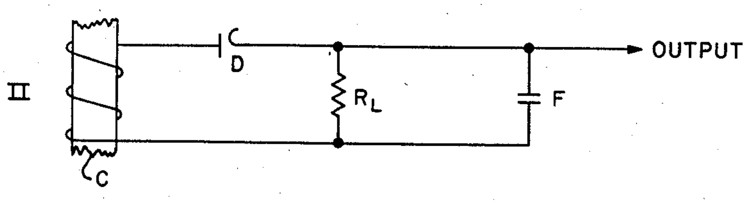
Figure 18:
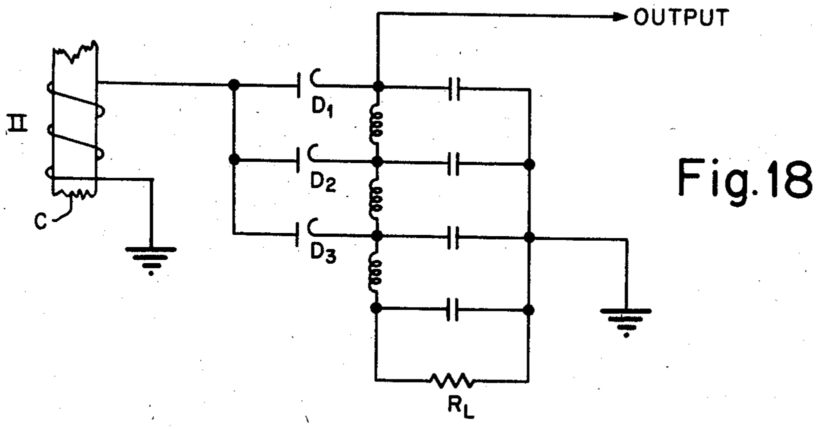
Figure 19:
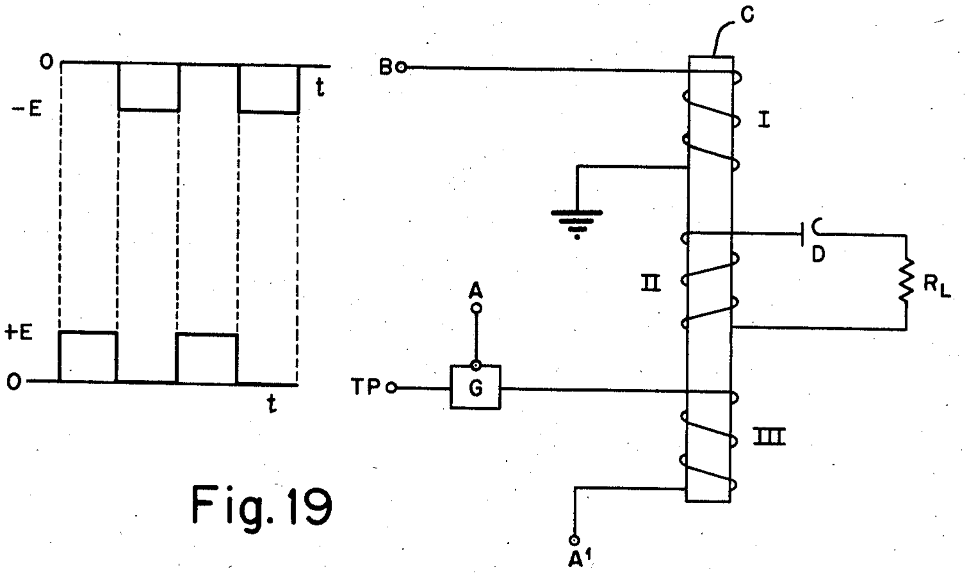
Figure 20:
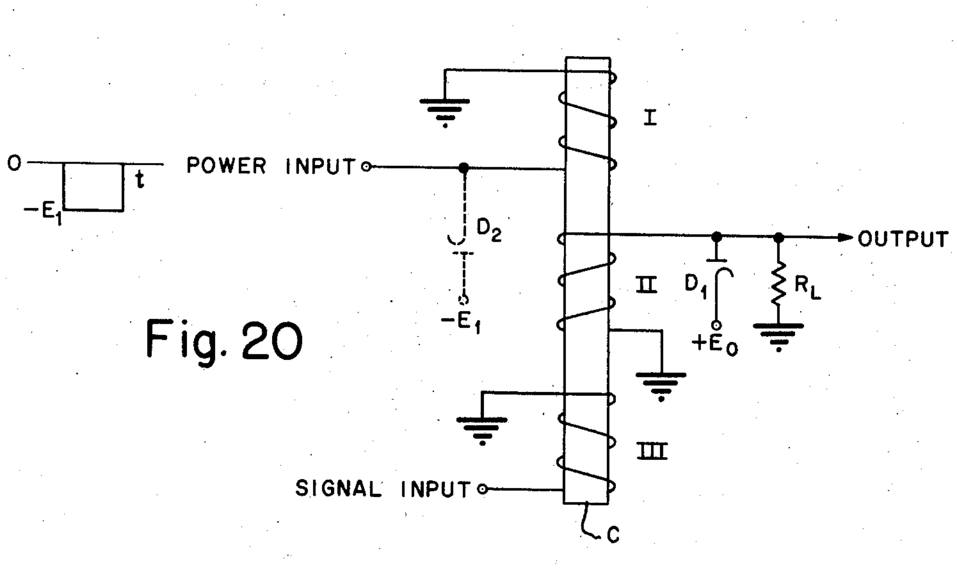
Figure 21:
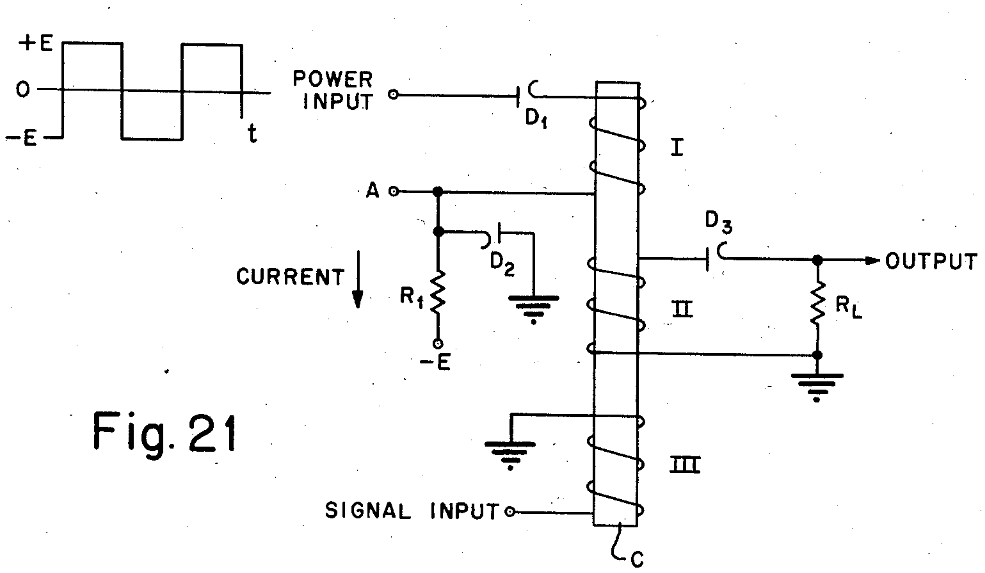
Figure 22:
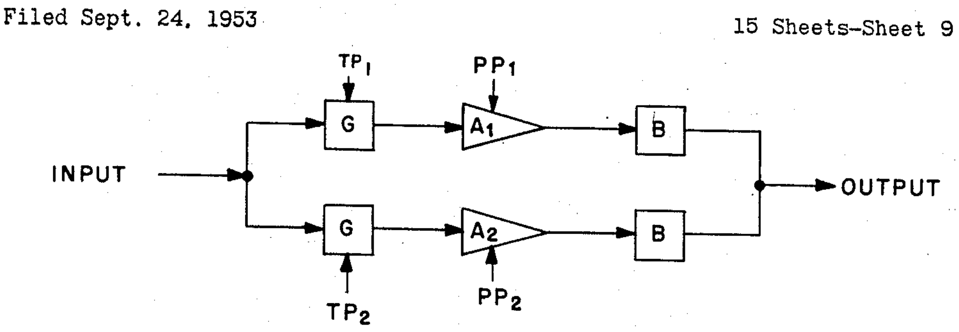
Figure 22A:
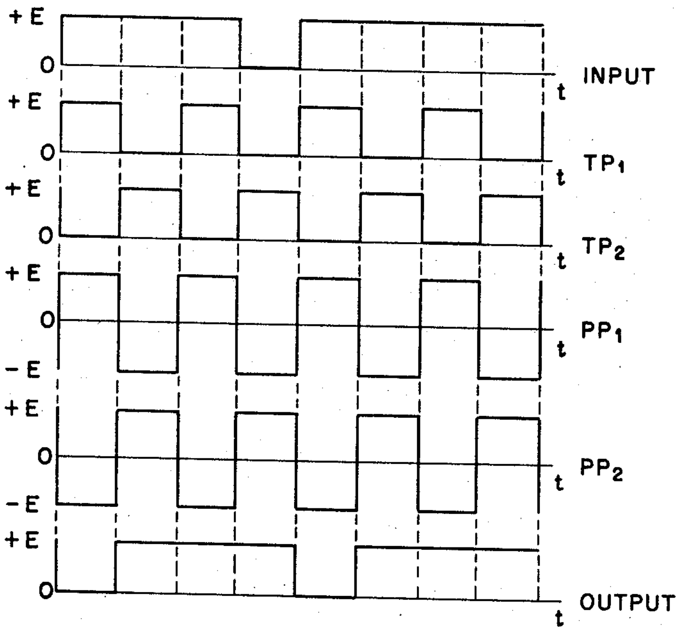
Figure 22B:
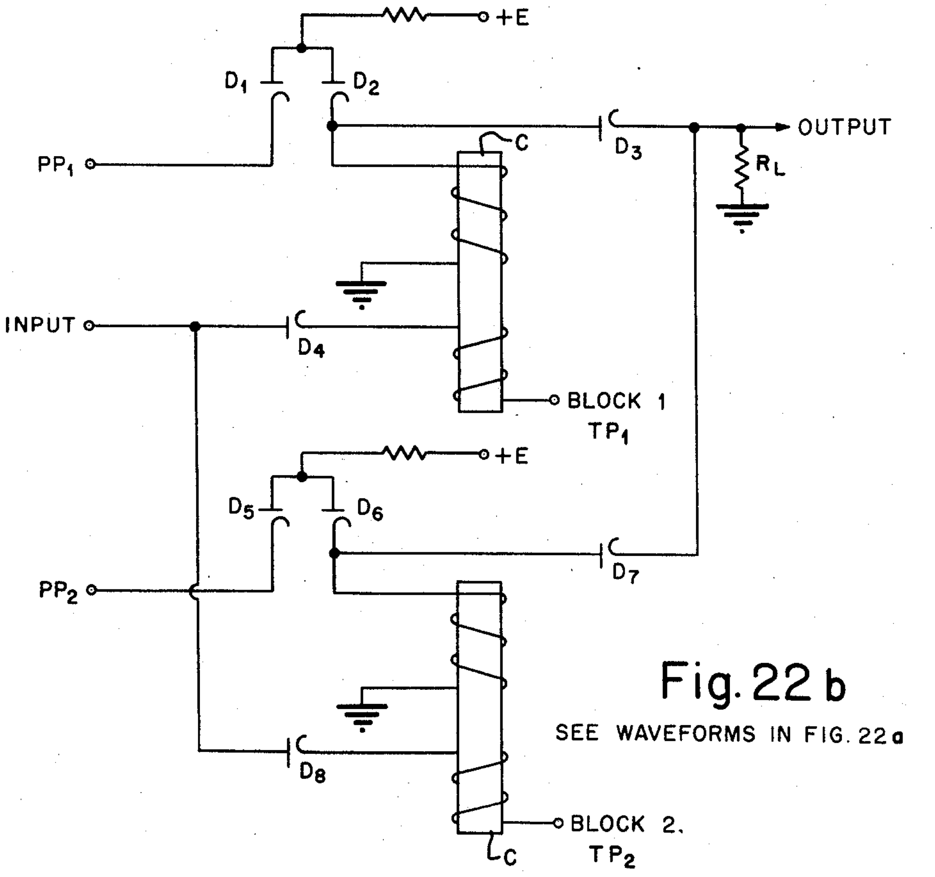
Figure 23:
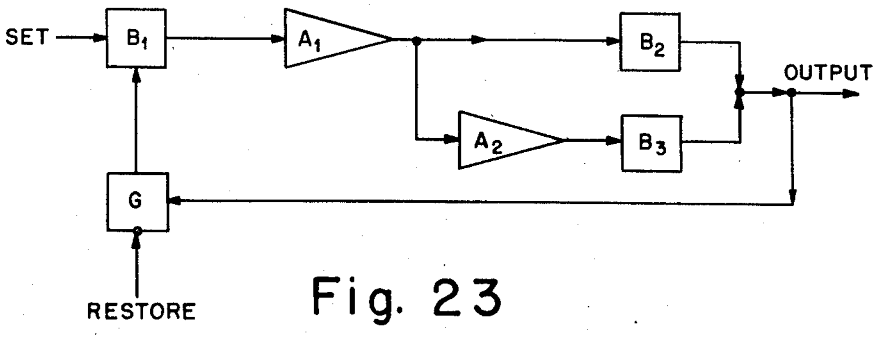
Figure 23A:
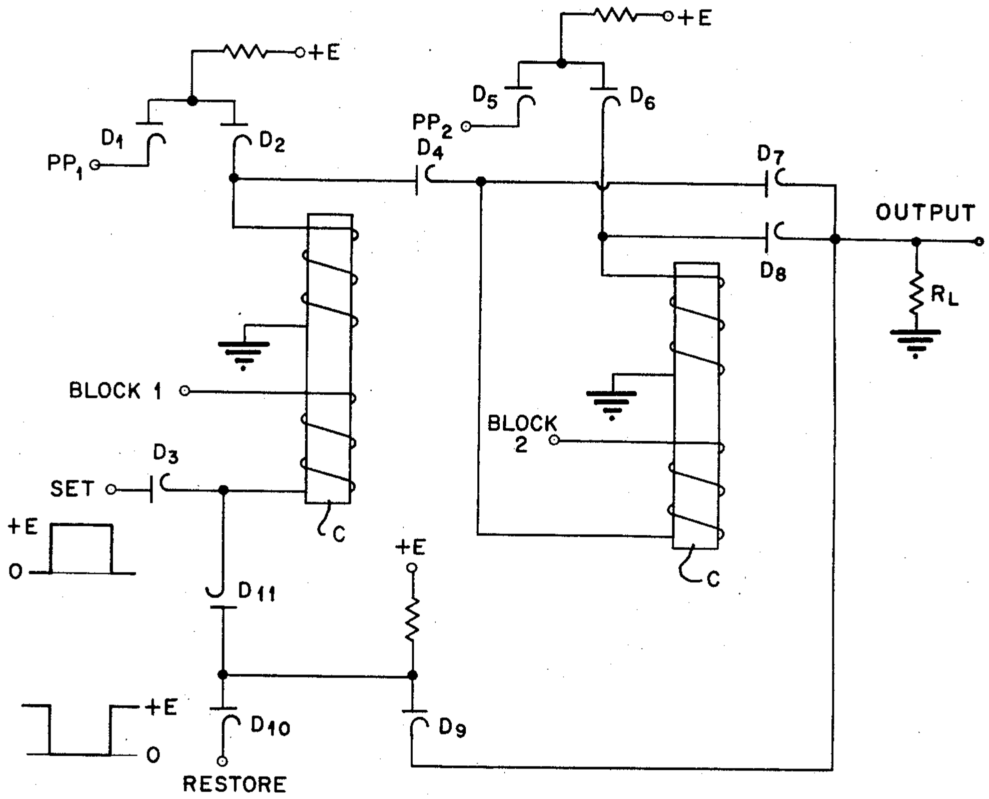
Figure 23B:
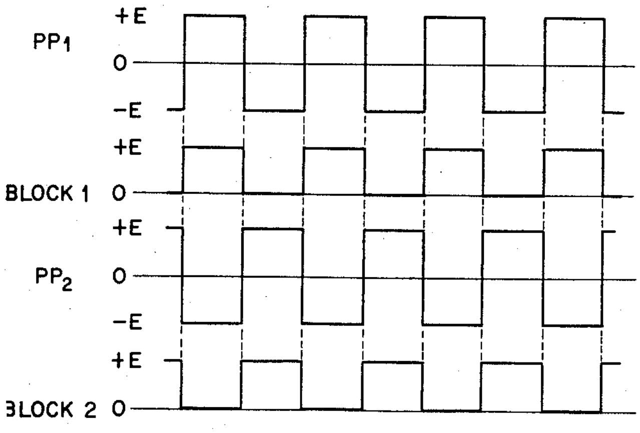
Figure 23C:
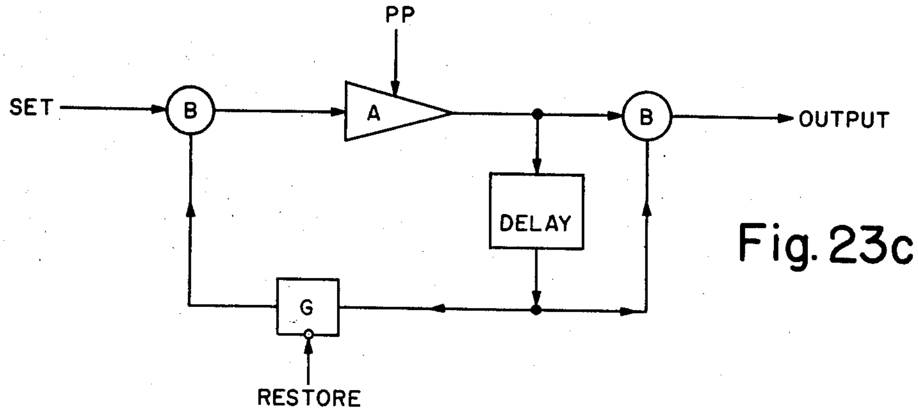
Figure 23D:
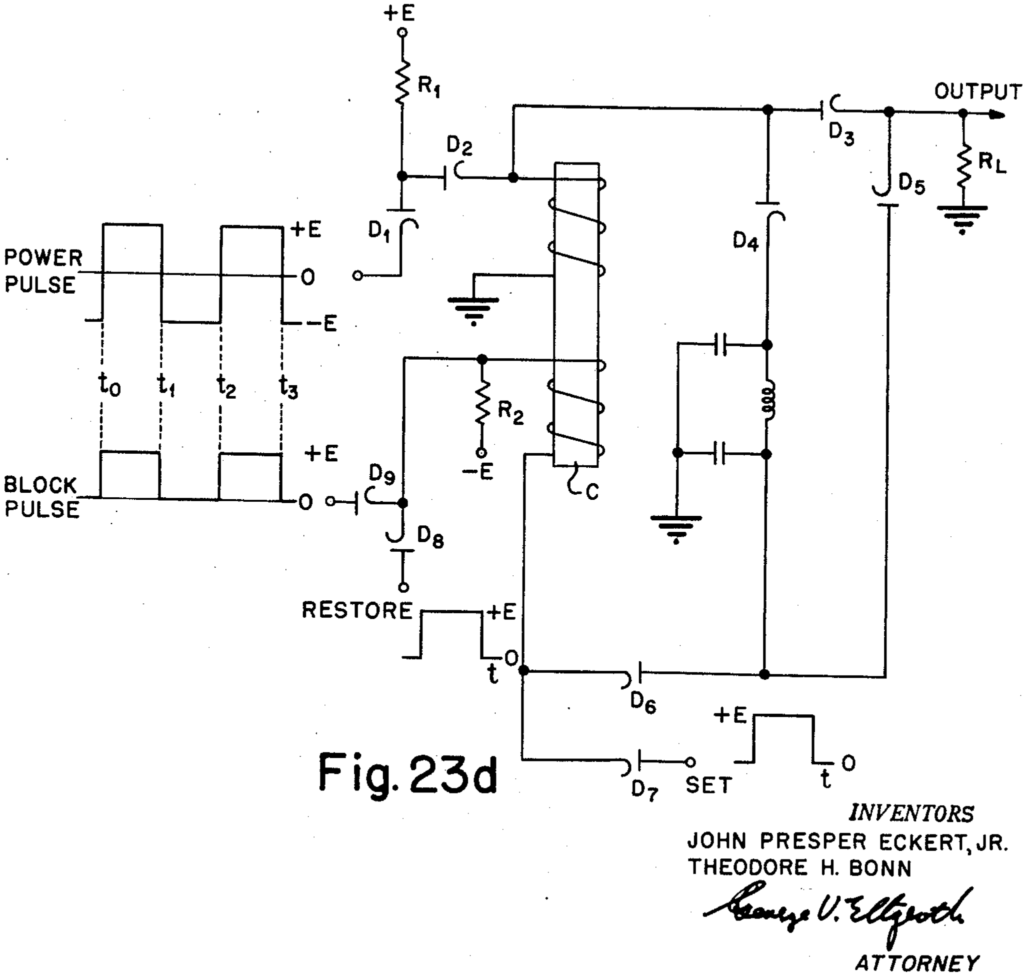
Figure 23E:
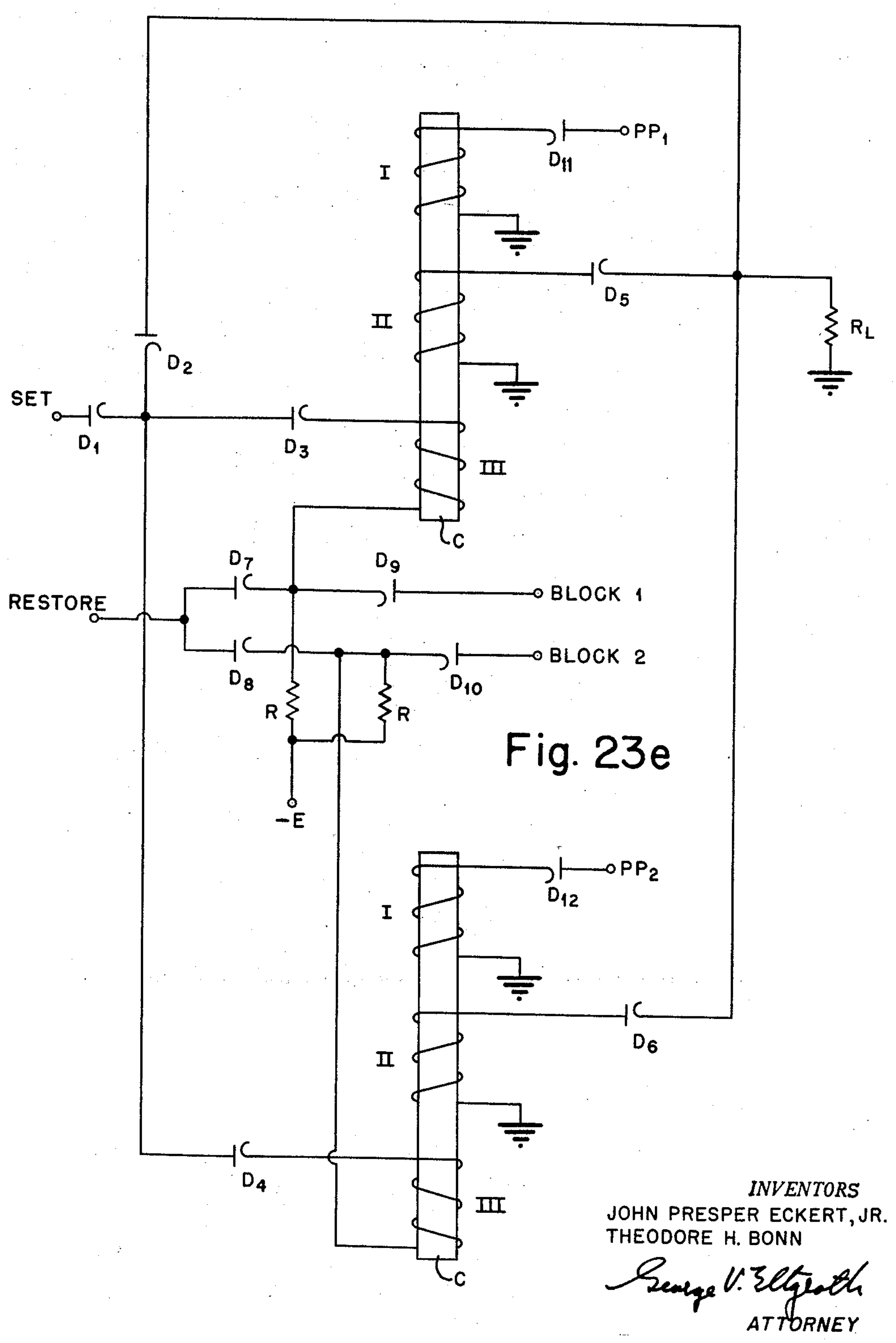
Figure 23G:
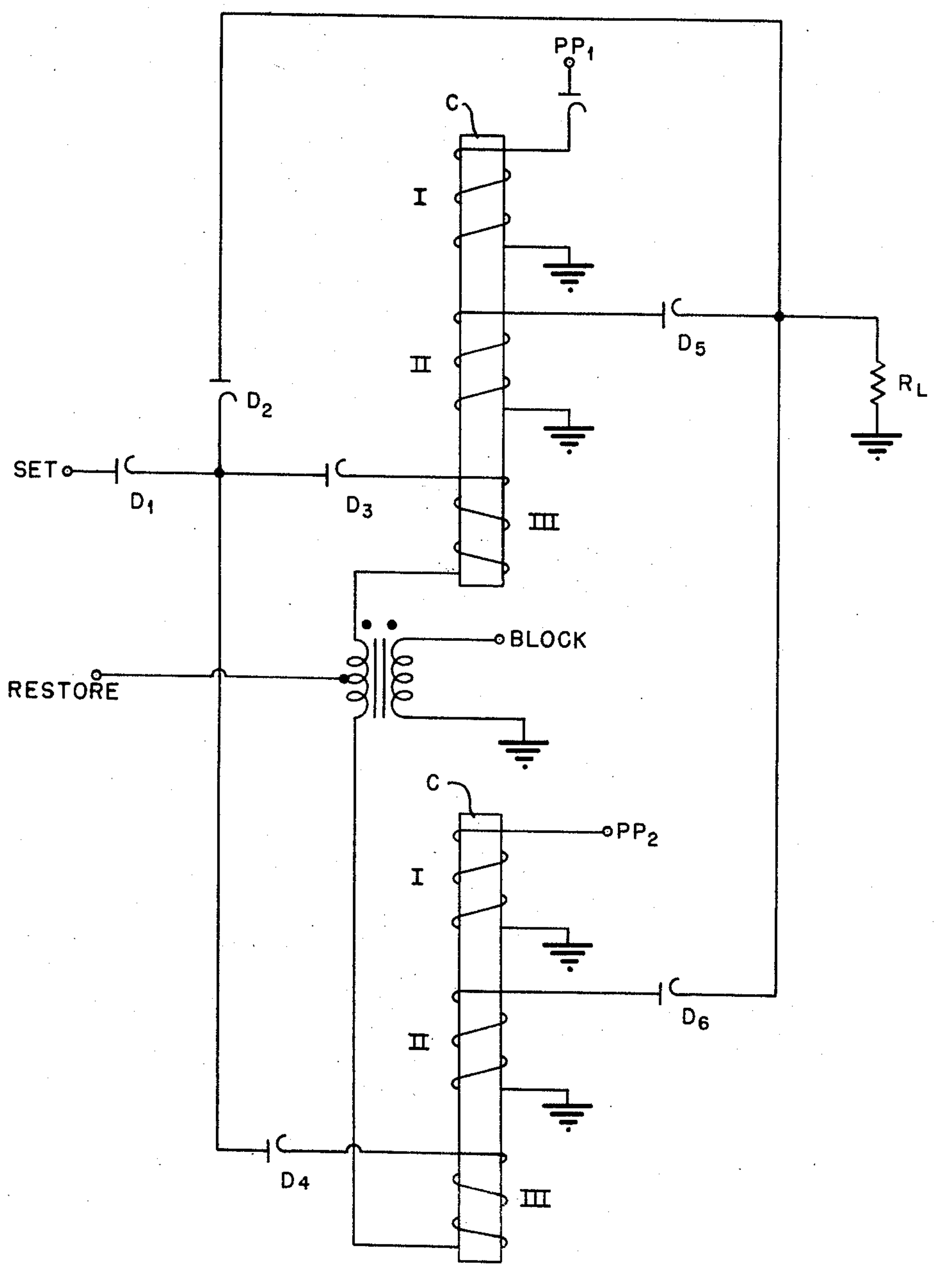
Figure 23F:
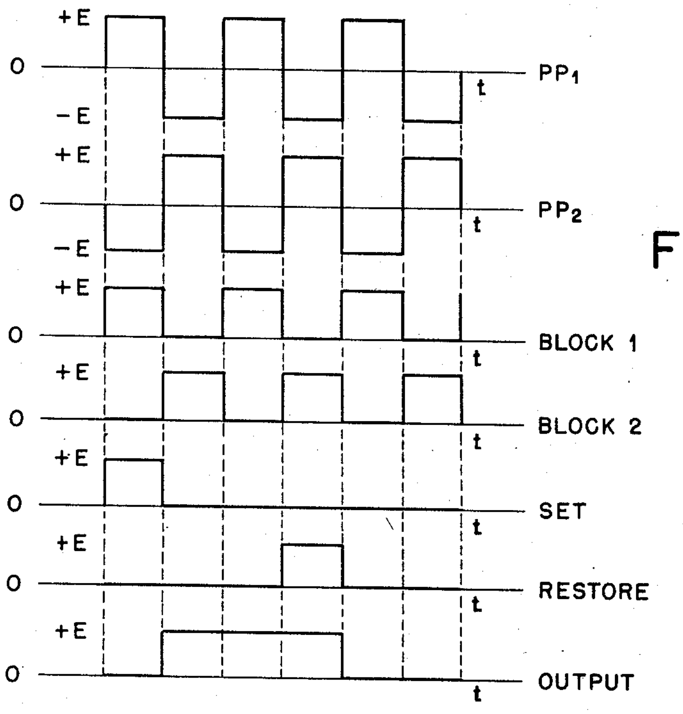
Figure 23H:
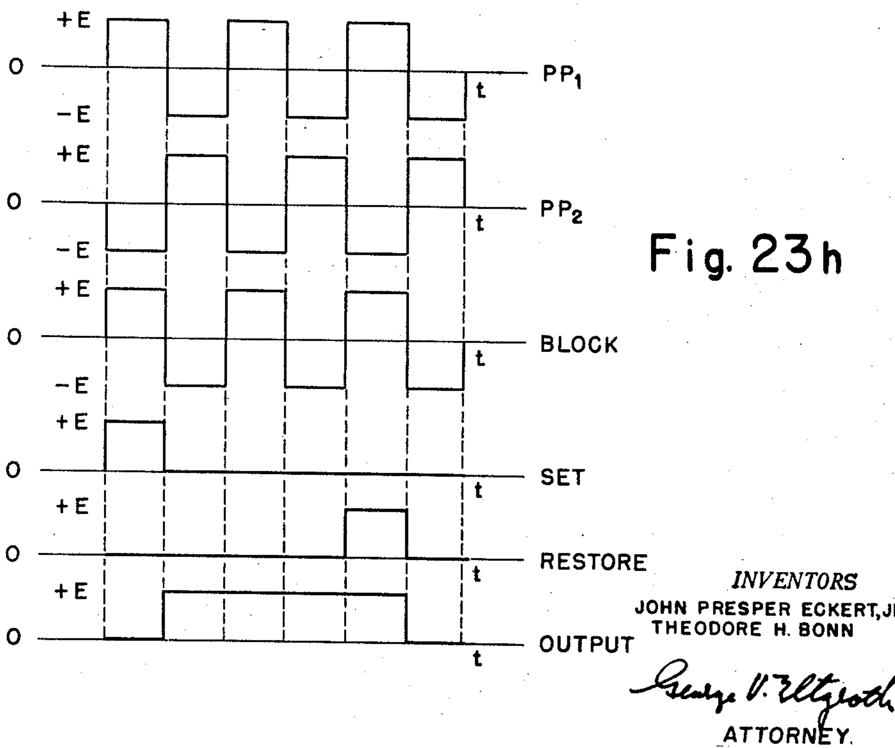

Figure 2*a* illustrates the operating time cycle for the embodiment of Figure 2;

Figure 3 illustrates some representative output wave forms;

Figure 4 shows an input winding with a constant current input;

Figure 5 shows an input winding with a constant voltage input;

Figure 6 illustrates some typical shapes of power pulses;

Figure 7 shows output wave forms produced by some of the power pulses illustrated in Figure 6;

Figure 8 shows an input winding to be used in connection with the application of a constant current and the use of diodes and blocking pulses;

Figure 8*a* represents a first operating time cycle for the circuit of Figure 8;

Figure 8*b* represents a second operating time cycle for the circuit of Figure 8;

Figure 8*c* represents a third operating time cycle for the circuit of Figure 8;

Figure 9 illustrates an input winding to be used in connection with the application of a constant voltage;

Figure 9*a* shows the form of pulses to be applied to the circuits of Figure 9;

Figure 10 illustrates the three windings of a magnetic signal translating device to which D.C. power sources may be applied;

Figure 10*a* shows the pulse forms to be used in connection with the arrangement of Figure 10;

Figure 11 illustrates an arrangement in which the output is directly connected to the power winding;

Figure 11*a* shows a wave form which serves both as a power pulse and as a blocking pulse;

Figure 12 exemplifies the circuits of a single coil magnetic signal translating device;

Figure 13 illustrates an output winding and a first method of removing the sneak pulse;

Figure 13*a* shows the form of an auxiliary pulse to be applied to the circuit of Figure 13;

Figure 14 illustrates an output winding and a second method of removing the sneak pulse;

Figure 15 shows a single output winding coupled to two separate cores;

Figure 16 shows an imput winding to which, in addition to the signal impulse, a constant current and an alternately positive and negative power pulse are to be applied;

Figure 16*a* illustrates the operating time cycle for the circuit of Figure 16;

Figure 17 illustrates a first example of an ouput winding with a circuit arrangement for obtaining a steady output;

Figure 18 gives a second example of an output winding with a circuit arrangement for obtaining a steady output;

Figure 19 shows a three-winding signal translating device with the circuits so arranged as to obtain the effects of a complementer;

Figure 20 shows the three windings of a signal translating device with the output circuit so arranged as to keep the output constant in amplitude and duration;

Figure 21 illustrates a three-winding signal translating device to which a constant power voltage may be applied;

Figure 22 shows a block diagram of a signal translating system to be used for interlacing signals;

Figure 22*a* gives a timing diagram which may be used in connection with the system of Figure 22;

Figure 22*b* shows a schematic diagram for the system of Figure 22;

Figure 23 gives a block diagram of a first signal translating system to be used for flip-flop effects;

Figure 23*a* represents the schematic diagram for the circuit of Figure 23;

Figure 23*b* illustrates the power waves and blocking pulses to be applied to the circuit of Figure 23*a*;

Figure 23*c* gives a block diagram of a second signal translating system to be used for flip-flop effects;

Figure 23*d* represents the schematic diagram for the circuit of Figure 23*c*;

Figure 23*e* shows a third flip-flop arrangement in schematic form;

Figure 23*f* illustrates the power waves and blocking pulses to be applied to the circuit of Figure 23*e*;

Figure 23*g* shows a fourth flip-flop arrangement in schematic form;

Figure 23*h* illustrates the power waves and blocking pulses to be applied to the circuit of Figure 23*g*.

Figure 1:
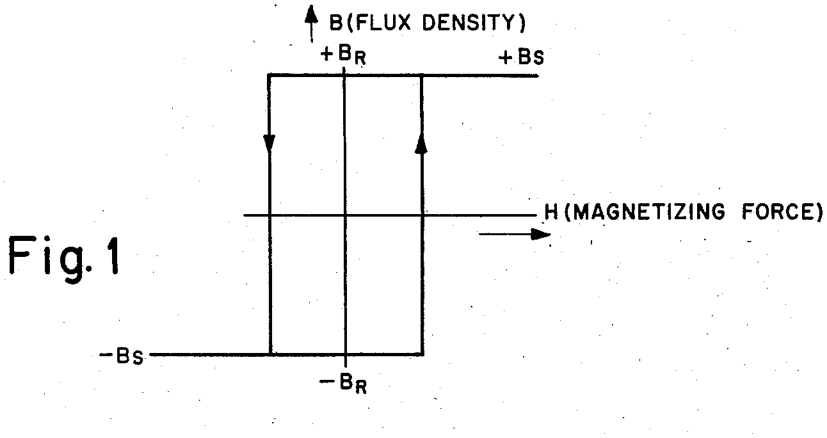
Figure 1 is a diagram of an idealized hysteresis loop.

Figure 1 illustrates an idealized hysteresis loop of a material which may be used as the core member for the solid-state signal translating devices to be described. $B_R$ signifies residual flux density and $B_S$ designates saturation flux density. The core material may be made of a variety of materials among which are the various types of ferrites and the various kinds of ferromagnetic alloys, including Orthonik and 4–79 Moly-Permalloy. These materials may have different heat treatments to give them different properties. In addition to the wide variety of materials applicable, the cores of the signal translating devices may be constructed in a number of different geometries involving both closed and open paths. For example, cup-shaped cores, strips of material or toroidal cores are possible.

It is to be understood that the invention is not limited to any specific geometries of the cores nor to any specific materials therefor, and that the examples given are illustrative only. The only requisite is that the material possesses a hysteresis loop preferably approaching the idealized hysteresis loop as shown in Figure 1.

Before describing the signal translating devices, the terms to be used in regard to different kinds of electric pulses will be defined. There are clock pulses and signal pulses. The signal pulses carry information and are, therefore, selectively applied. It depends upon the information to be transmitted whether such pulses are present or not. The clock pulses are automatically applied and do not carry any information. They may be subdivided into power pulses and blocking pulses. The power pulses usually supply the power for the operation of the signal translating device or, at least, open a gate to permit another source to operate the signal translating device. The blocking pulses block the interference of the power pulse with the signal input circuit and/or of the signal input circuit with the power circuit.

Figure 2 illustrates the basic arrangement of parts of a solid-state magnetic signal translating device. Part C is a core of ferromagnetic material. Winding I is the power winding, winding II is the output winding and winding III is the input winding. Power pulses are applied to winding I at, for example, terminal B. The solid arrow at terminal B indicates the direction of current of the power pulse. The solid arrow above core C indicates the direction of flux that this current causes in core C. A typical shape of the power pulse versus time is shown in the waveform of Figure 2*a* to the left of terminal B. This power pulse causes a current to flow in the load resistor $R_L$ in the direction shown by the solid arrow near winding II. The power pulse also causes a current to flow in winding III in the direction of the dotted arrow shown at terminal A. When a signal pulse is applied to terminal A of the signal winding, a current is made to flow in the signal winding in the direction of the solid arrow shown near terminal A. The waveform of Figure 2*a* to the left of terminal A is a typical waveform which might be applied to terminal A. The vertical lines connecting the waveforms of Figure 2*a* indicate the time relationship between the signal input pulse, which may or may not be present at terminal A, and the power pulse which occurs at terminal B.

The idealized BH loop of Figure 1 is a convenient means for describing the method of operation of the signal translating device. First, it will be assumed that there are no information pulses and that the power pulse is in such a direction as to drive core C from plus $B_R$ to plus $B_S$. In this event, there is a small flux change in the core, and hence an output voltage will be generated which, as a rule, is short in duration and, in the case of some materials, also small in amplitude (sneak pulse).

Figure 3 shows representative output waveforms. Waveforms X and $X^1$ are the types which would occur in the case just discussed, namely in the absence of an information pulse preceding the power pulse. The exact size and shape of these waveforms is determined by a number of factors, for example, the slope of the BH loop between $B_R$ and $B_S$, the amplitude and wave shape of the power pulse, the value of the load resistance, the power circuit inductance, eddy current phenomena in the core, distributed capacitances of the winding, etc.

Now, however, it will be assumed that an information pulse has occurred preceding the power pulse. When the preceding power pulse returned to 0, it left the core in the plus $B_R$ position. The information pulse causes the material to travel from plus $B_R$ to minus $B_R$ in a counterclockwise direction around the hysteresis loop. There is a large change of flux. Any currents which tend to flow in circuit II, the load circuit, are blocked by the diode D. Therefore, the only power which must be supplied from the information pulse is that power required to move the core from plus $B_R$ to minus $B_R$ and the power transferred to circuit I, the power circuit. Effective means have been found to block power transfer to the power circuit, as will be explained hereinafter. Therefore, the only power consumed from the signal input circuit is the power absorbed by the core in moving from plus $B_R$ to minus $B_R$ in the given time. After the period of time allotted to the signal pulse, the power pulse occurs and the core now starts from minus $B_R$ and proceeds to plus $B_R$. The core undergoes a large flux change and a large voltage is induced in winding II.

Curve Y, Figure 3, shows a representative output voltage versus time curve obtained when the material is operated between minus $B_R$ and plus $B_R$. The length of the output signal approximately equals the duration of the power pulse. Note that the current induced, which is in the direction of the solid arrow at winding II, Figure 2, is in the direction which will pass through the diode D.

The power delivered to the load may be many times larger than the power required of the information pulse. A net power gain is, therefore, obtainable in the signal translating device. Many factors influence the amount of power obtained. One of the most important factors, however, has to do with the extent to which the unwanted pulse, known as the sneak pulse and shown at X or $X^1$ in Figure 3, may be tolerated in any practical situation. Another important factor is represented by the ratio of the slope on the steep portion of the hysteresis loop between plus $B_R$ and minus $B_R$ to the slope of the flat portion of the hysteresis loop between plus $B_R$ and plus $B_S$. A material with a rectangular hysteresis loop is desirable for this signal translating device, although by no means completely necessary.

Thus, the fundamental method of operation of this translating device has been shown. When no information pulses are applied, the material goes from plus $B_R$ to plus $B_S$ and returns to plus $B_R$; only a sneak pulse as X or $X^1$ in Figure 3 results across $R_L$. When a signal pulse has been received, the material moves from plus $B_R$ to minus $B_R$; an output as Y in Figure 3 results across $R_L$, and the material returns to plus $B_R$. Thus, the desired output signal occurs when and while the material travels within the steep middle portion of the loop where the permeability is at its greatest.

A signal translating device operating in the manner just described will be designated hereinafter as an "amplifier." It should be understood, however, that the use of the term "amplifier" is not confined to cases of actual amplification, but extended to cover all devices which produce an output signal in response to the application of an input signal, regardless of the fact that the power, current or voltage output to input ratio may be greater than, equal to or less than unity. If, in contrast thereto, an output signal is produced in response to the non-application of an input signal, then the device will be called a "complementer."

It also should be realized that the device illustrated in Figure 2 as all the other devices described hereinafter operate as so-called "parallel" magnetic amplifiers or complementers. This means that the load circuit or circuits are arranged in a parallel relationship to the output winding when viewed from the power source, the power being supplied, in the average case, by a constant current source. The desired output signals are produced, therefore, through changes in the residual flux density which, as a rule, follow the path of the hysteresis loop and keep the core within the high permeability region, i.e., between plus and minus $B_R$.

In Figure 2, the load on circuit 2 is shown as a resistor. However, this might very well be any passive or active network including resistors, capacitors, inductors, any conceivable combination thereof, computing circuits, buffers, gates and other amplifiers.

In the waveforms illustrated in Figure 2*a*, the power pulse is shown occurring coincident with the end of the signal pulse. The time period $t_1$ marks the beginning of the signal pulse, $t_2$ marks the end of the signal pulse and the beginning of the power pulse, and $t_3$ marks the end of the power pulse. Actually, $t_1$, $t_2$ and $t_3$ mark the boundaries of the periods allotted to the signal and power pulses and by no means indicate the length of these pulses. The period $t_1$ to $t_2$ may be a relatively long time as, for example, one minute, and the actual signal pulse may have a duration of one microsecond. This one microsecond can occur at any time during the one minute period allotted to the signal. The power pulse, since it always occurs, is given a period equal to its duration. Its duration may be either greater or less than the actual duration of the signal pulse, and it may be applied at any time after the signal pulse. Therefore, this amplifier may also serve as a memory or a delay device. In view of the fact that the power pulse is derived from a source whose waveform can be accurately fixed, output pulses from this amplifier are of standard waveforms as determined by the power pulse source. This amplifier serves also, therefore, as a pulse former and pulse timing device.

In some instances, it may be desirable to obtain the amplifier information at some time which is not necessarily fixed. In this case, pulses applied to coil I may also be selectively controlled information pulses. Then the amplifier functions as a delayed gate. The information pulse applied to coil III selectively allows an output to occur when such output is selectively called for by an information pulse on coil I.

In Figure 2, the amplifier is shown with one signal input, one output and one power winding. Actually, a signal amplifier may have many signal input, output and power windings. Thus, it is possible for the amplifier to be operated by one of several sources and/or to operate several loads. These sources and/or loads can have different impedance and voltage levels and different polarities. The number of turns on the various windings would be adjusted to match the characteristics of the particular circuit.

Several input circuits will now be shown to handle the various problems which arise in operating this type of solid-state amplifier with both constant current and constant voltage sources. It should be stressed, in this connection, that the power pulse applied to coil I (the power winding) may, preferably, be taken from a constant current source.

A constant current source is theoretically a source of infinite impedance. A constant voltage source is theoretically a source of zero impedance. These definitions are idealized and are merely used to obtain a simplification in the analyses of circuits. From a practical point of view, the constant current source is a source whose impedance is comparatively high with respect to the load, and a constant voltage source is a source whose impedance is comparatively low with respect to the load.

Figure 4 represents a constant current input source which can be used with this type of amplifier. The portion of the core C shown corresponds to coil III of Figure 2. The directions of the currents, voltages, and fluxes shown are the same as those in Figure 2. Normally, when no signal is applied to terminal A, terminal A is at a small negative potential such that the potential on the plate of diode P is zero, and the current from the constant current source S flows through the diode P in series with A, and no current flows through coil III. In order to relax the tolerance requirements on this negative voltage, a diode Q may be inserted as shown in series with terminal $A^1$. If Q is present, the small negative voltage may be larger and diode Q will cut off. Reverse current will thereby be prevented from flowing in coil III. When an input is desired, a positive pulse is applied to terminal A; the diode P, in series with A, cuts off; and the current which formerly flowed through A now flows in coil III in the direction shown by the solid arrow. This principle is also applicable to the means for producing the power pulse. In this case, the actual power source would be the D.C. source of constant current and the source of switching pulses which cause this current to flow in coil III at the required time.

Figure 5 shows a constant voltage type of input in which the signal source S is theoretically an impedanceless source. The same portion of the core C as in Figure 4 is shown here. $Z_0$ is the internal impedance of a practical source and $Z_1$ is an impedance placed in series with the input coil III of the amplifier. The signal source S is selectively actuated to apply an input pulse. By placing a capacitor, shown dotted, across $Z_1$ a faster change in current can be obtained.

In the previous descriptions, both the signal and the power pulse were shown as square waves. In practice, many waveforms are possible. It is essential, however, that the signal pulse, if selectively applied, is present during the signal period. Whether or not this signal pulse may extend into a power pulse period, depends upon the characteristics of the other elements in the over-all circuit system within which this amplifier is to be used. If the time integral of the signal voltage during the signal period is equal to or greater than $2 \times 10^{-8}$ $B_RAN$ volts (where A is the area of the magnetic circuit in square centimeters, $B_R$ is in gauss and N the number of turns), then full output is obtained from the amplifier. If, on the other hand, the time integral of the signal voltage is less than $2 \times 10^{-8}$ $B_RAN$ volts, an output proportionately smaller than the full output will be obtained. This effect may be used to make a lower power amplifier without decreasing the volume of magnetic material present. Therefore, it is not necessary, and indeed may not be desirable, that the amplifier operate with the full excursion between plus $B_R$ and minus $B_R$ as stated hereinabove.

Figure 6 shows some typical shapes of power pulses which might be used. Figure 6*a* shows a half sine wave; Figure 6*b* shows a triangular wave; Figure 6*c* shows a Gaussian curve; and Figure 6*d* shows a flat-top pulse with unequal rise time and fall time. The main considerations in determining the shape of the power pulse are the effect of its shape on the sneak pulse and output pulse, and the back voltage applied to the diode in series with the load resistance at the time that the power pulse returns to zero. Usually, with the materials used, the greatest change of flux between $B_R$ and $B_S$ occurs near $B_R$. Therefore, if the power pulse is made to travel slowly over this region, the sneak pulse would be of lower amplitude during the lower rise; the output would also be smaller, though. If a power pulse as shown in Figure 6*c* is used, the output and sneak pulse will be as illustrated in curves Y and X, Figure 7*a*, respectively. If the waveform as shown in Figure 6*d* is used, the output and sneak pulse will be as shown in curves Y and X, Figure 7*b*, respectively.

One of the important problems connected with these amplifiers is the method of preventing power pulses from delivering energy to the signal input winding and the method of preventing the signal winding from delivering energy to the output winding. Several methods or combinations of methods can be used. One simple case occurs when the power winding is connected to a high impedance source. In this case, the high impedance itself prevents energy transfer from the signal to the power winding. Various combinations of diodes and blocking voltages can also be used on both signal and power windings.

Figure 8 is an example of how diodes and blocking pulses can be used to isolate the power winding from the input or the input from the power winding, whenever a constant current source is used for the input winding. (In the case of coil I (the power winding), the application of a constant current source may be regarded as a rule.) The portion of core C containing the input winding as in Figure 2 is redrawn in Figure 8. A similar arrangement may be used for the power circuit, but the diode corresponding to diode P would not be necessary in such a case, provided that the point corresponding to point S is connected to a device which prevents any back flow of current. The waveforms applied in one method of using this principle are shown in Figure 8*a*. The pulse applied to the power winding is shown in the first line of Figure 8*a*. At the same time, a positive pulse is applied to point $A^1$ from a blocking source, as shown in the second line of Figure 8*a*. This cuts off the diode Q in series with $A^1$ and prevents flow of current which, as a result of transformer action, would try to flow as shown by the dotted arrow. The blocking pulse has the same or greater duration as the power pulse and sufficient amplitude to prevent the flow of current. At some later time, as previously described, a signal pulse is applied to point A, as shown in the third line of Figure 8*a*. Figure 8*b* shows an alternate method for accomplishing this result. Here the blocking pulse is applied to the point A (second line of Fig. 8*b*) and the signal to point $A^1$ (third line of Fig. 8*b*). In this case, the polarities of both the blocking pulse and the signal are negative.

Another method for accomplishing the same thing is shown in Figure 8*c*. The power pulse is the same as previously described. Now, however, a waveform as shown in the second line is applied to terminal S. This waveform is called the block and signal supply because it is of the correct polarity to block during the power pulse period, and it can supply power to the signal winding in the event that a waveform, as shown in the last line, appears at point A. Point $A^1$ would be grounded in this case, and diode P may be eliminated.

Figure 9 shows a method of isolating the power pulse from the input when using a constant voltage source. Here again only coil III and part of core C, as in Figure 2, are shown. A power pulse of the type shown in the first line of Figure 9*a* is applied in the manner previously described. During the period of the power pulse, a blocking voltage from a low impedance source is applied at point $A^1$. This acts to cut off the diode P in series with terminal A and prevents current from flowing in the direction of the dotted arrow. This is the direction in which the power pulse would tend to make the current flow. A signal pulse as shown in the botom waveform of Figure 9*a* is selectively applied at point A.

Figure 10 shows both D.C. power sources and blocking pulses which can be used on both power and signal windings in an amplifier. A power pulse is applied as shown at point B and the constant current from $S^1$, which normally would flow to B, is made to flow through coil I. At the same time, a blocking voltage is applied at point $A^1$. During the signal period, a positive signal pulse is applied to terminal A and the current from S, which normally would flow through A, is made to flow through coil III. Also during the signal period a positive blocking voltage is applied at point $B^1$. Note that if a signal pulse does not occur, the block is applied anyhow so that the signal source does not have to supply power required to block. The application of the block in no way harms the operation of the amplifier.

In the preliminary description of the operation of the amplifier, the output winding was shown as a separate winding II of Figure 2 and other figures. However, it is not necessary that this be so. The output may be connected as shown in Figure 11, i.e., across the power winding I with the diode D in series with the load $R_L$. The input and output waveforms are the same as shown before. The previously discussed principles, for example, those of Figure 10, can be still applied to this circuit. A block such as applied at $B^1$, Figure 10, can also be applied at $B^1$, Figure 11, and a power pulse can be applied at B, Figure 11. The power pulse applied at B may also serve as a blocking pulse if it is allowed to go negative, as shown in Figure 11*a*. In this case point $B^1$ would be grounded.

A magnetic amplifier may be constructed having only one coil on a core of ferromagnetic material. An example of a single coil magnetic amplifier is shown in Figure 12. This amplifier has a constant current applied via resistor $R_S$. During the power period, when the power input has a positive pulse applied thereto, diode $D_1$ cuts off and current flows through resistor $R_S$, the amplifier coil and diode $D_5$, in series, and through diode $D_4$ and the load resistor $R_L$. Assuming that there has been no signal input, the core will be at plus $B_R$ flux density, when the power pulse arrives, and will travel from plus $B_R$ to plus $B_S$, and there will be only a small voltage across $R_L$, and only a sneak output pulse will result.

During the signal input period, a negative pulse is applied to the power input. Diode $D_1$ will connect, and point A will be at the potential of the negative pulse applied to the power input. Diodes $D_4$ and $D_5$ will disconnect, and no current will flow through the amplifier coil. If a signal input is applied at this time through capacitor F, diode $D_3$ will connect, and a current will flow through the amplifier coil in the reverse direction, driving the core from plus $B_R$ flux density to minus $B_R$ flux density. Then, during the next power pulse, the core will travel from minus $B_R$ to plus $B_R$ and a large output will result.

A voltage gain may be obtained from this amplifier by connecting diode $D_3$ to point B instead of point X as shown. In this case it will require less voltage (although more current) to reset the amplifier from plus $B_R$ to minus $B_R$.

In the amplifiers described above one of the major problems concerns itself with the removal of the sneak pulse. Figure 13 shows one simple method of removing the sneak pulse. A part of core C, Figure 2, including the output winding and load, is shown in Figure 13. At the same instant that the power pulse is applied, an auxiliary pulse, such as shown in Figure 13*a*, is applied to terminal G. This is a negative pulse instantaneously equal to or greater than the sneak pulse generated in core C. The application of this pulse prevents diode D from conducting, and, as a result, there is no output during the sneak pulse period. Of course, the pulse at G, since it is applied whenever the power pulse is applied, will subtract from the output whenever an output is expected. This, however, means only a minor decrease in power output.

Further methods of removing the sneak pulse would be to use non-linear circuit elements such as a saturable reactor or non-linear resistor or capacitor as part of the load circuit. The non-linear element would be so arranged so that its impedance is very low during the sneak pulse period or for voltages equal to the sneak pulse. However, for voltages of the duration and amplitude of the power pulse, the impedance of the non-linear element would be high. In general, this could be mechanized by having the non-linear element held at a low impedance state, and the output would then tend to drive this non-linear element to a high impedance state. An output of the sneak pulse type would not succeed in raising the impedance. However, an output pulse equal to the desired output pulse would drive the material to the high impedance region. Non-linear elements for suppressing the sneak pulse may be used either in series or in parallel with the load impedance.

Figure 14 shows a general method of removing the sneak pulse by filtering. This method depends upon the fact that the sneak pulse, in many cases, has components of higher frequency than the desired output pulse. Therefore, frequency discriminating networks can be constructed to discriminate between the two pulses. $Z_1$ is a shunt element which shows a low impedance to the frequency components of the sneak pulse, but a high impedance to the frequency components of the desired output pulse. $Z_2$ is a series element which shows a high impedance to the frequency components of the sneak pulse, but a low impedance to the frequency components of the desired output pulse. Although the drawing illustrates a combined application of both elements, either one of these elements may be used separately with substantially the same effect. $Z_1$ and $Z_2$ can be any one of a number of well-known filter elements, including series and parallel tuned circuits, high and low pass filters, bridged T and twin T networks, iterative networks, etc.

In addition to the above-mentioned schemes, it is often possible to eliminate the sneak pulse by balancing against a sneak pulse of opposite polarity from some other core. This is shown in Figure 15. The other core may be a dummy core used with the amplifier expressly for the purpose of forming a pulse which will cancel the sneak pulse, or it may be another amplifier core which happens to produce the required pulse form.

It is also possible to use a combination of the above methods of removing the sneak pulse. For example, the filters may alter the shape of the sneak pulse by partially integrating it in such a manner that clipping would be a simple way to remove the part of the sneak pulse that remains after filtering.

Another way of removing the effects of a sneak pulse is to neutralize all output effects during the time period which approximates the comparatively short duration of such a pulse. This may be regarded as the simplest method, but still an extremely efficient one. In the case of the "parallel" magnetic amplifier, the sneak pulse is, as a rule, a sharp and narrow pulse, as indicated hereinabove, which very often, however, may have the same amplitude as the desired signal output. It is, therefore, appropriate to use time characteristics instead of amplitude characteristics for the separation of these two types of output pulses. Gating devices may be installed in the output circuits which permit the passage of an output pulse only when its duration exceeds the determinable duration of a sneak pulse and lasts beyond $t_a$ in Figure 3. A description of such gating devices is not considered necessary since devices which open after a predetermined time interval are well known to those versed in the art.

In many of the arrangements previously described the fall time is extremely longer than the rise time with the same power applied. Considering the amplifier shown in Figure 16 which is a magnetic amplifier with a constant current supply connected to the power winding I, the time required for the current to transfer back through diode P, when the power pulse at B returns to zero at $t_2$, as shown in Figure 16*a*, will be very much longer because of the low voltage available to effect this transfer. Accordingly, the rise time will be short, but the fall time will be extremely long.

One way of decreasing the fall time is to use a diverting pulse to divert the current in coil I very rapidly. Diode P may be used for this purpose. During the period $t_2$ to $t_3$, a large negative voltage or diverting pulse is applied to terminal B. The current which had been flowing through coil I is caused to make the transfer to diode P rapidly, if the negative voltage applied at B is equal to or greater than the voltage across the coil I. Thus, the output of the amplifier cuts off rapidly. The constant current now flows through diode P. Therefore, the current in the power winding alternates between coil I during the period $t_1$ to $t_2$ and diode P during the period $t_2$ to $t_3$.

This shows an example of where the application of a cut-off pulse to turn the amplifier off results in a considerable decrease in the switching time of the amplifier. It is to be noted that the negative voltage applied to terminal B in Figure 16 could be much greater than the positive voltage applied at B so that the amplifier could cut off more rapidly than it is turned on. In the case of Figure 11 the blocking pulse shown there may have the additional function of the diverting pulse as described hereinabove, provided that the negative voltage of this blocking pulse is more negative than necessary for blocking.

In the magnetic amplifiers previously described, it is sometimes desirable to obtain a steady output, when pulses are applied to the input. This can be done by utilizing a rectifier or suitable filter circuit or integrating circuit on the output.

Figure 17 shows a circuit for obtaining a steady output. The output coil of a magnetic amplifier as shown in the basic arrangement of Figure 2 is shown at II. The output pulses charge up the capacitor F, and a steady output is obtained. If it is desired to reduce the steady output to zero, the input pulses of the amplifier are removed. It may take several pulse periods for the charge to leak off capacitor F. If a faster decay is desired, a clamp pulse could be applied to the output to reduce the output rapidly to zero.

Another circuit to obtain a steady output is shown in Figure 18 which utilizes an electric delay line of any well-known type as a pulse stretcher. The output circuit shown with the diodes feeding various points on the delay line is a standard type of pulse stretcher. It makes use of the propagation time from the various points on the delay line to the output to increase the length of the pulse. In an amplifier which operates on a 50—50 duty cycle, i.e., one in which the signal period and power period are of equal length, only two diodes would be necessary. The delay time between the two diodes would be equal to the length of either the signal or power periods. By the time the main output pulse injected at the output end of the delay line would have died down, the pulse from the diode down the transmission line, which is delayed by a time equal to the power pulse period, will have arrived at the output, and it will last for a period equal to the signal period. Therefore, a steady output will be obtained when pulses are applied to the delay line. This type of circuit has the advantage of a much more rapid fall time than the capacitor circuit shown in Figure 17 and, in general, no reset pulse will be required with this type of circuit.

Of course, where the pulse periods are not the same, for example, where the power period is shorter than the signal period, the same type of circuit could be used. However, it would be necessary to use more than two diodes. In the circuit of Figure 18, three diodes are shown. This could be used for any signal period length up to the point where the signal period is twice the power period. It is evident how this principle can be extended to include duty cycles of any ratio.

Figure 19 illustrates a method of constructing a complementer based on the magnetic amplifier described in connection with Figure 2. A timing pulse TP is always applied to the input of the gate G to set the amplifier to $-B_R$. A signal pulse at A inhibits the application of this timing pulse to the amplifier. Therefore, an output is obtained whenever there is no input; and no output is obtained when the input appears.

It is to be noted that the distinction between an amplifier and a complementer is not clear cut. For example, it is possible to take a complementer, as described above, and to invert the polarity of the output and obtain negative output pulses at all times except when there is a signal; the output will then be zero. If then a positive D.C. shift is effected by an amount equal to the amplitude of the negative output pulses, the complementer has been transformed into an amplifier which is logically indistinguishable therefrom. This, of course, shows another method of obtaining a complementer from a magnetic amplifier: invert the polarity of the output and apply a D.C. shift.

The amplifiers, which have been described, can be connected in a variety of ways to perform logical functions. The block diagrams presented in connection with the functional circuits to be described hereinafter symbolize the various elements therein. The magnetic amplifiers used in these circuits are symbolized by the generally accepted symbol for an amplifier.

In the amplifier shown in Figure 2, the amplitude and duration of the output pulse is a function of the magnitude of the load impedance $R_L$. In order to keep the output pulse constant in amplitude and duration, when a constant current power input is utilized, a diode clamp as $D_1$, as shown in Figure 20, may be inserted in the output circuit. This clamp will limit the amplitude of the output voltage to a value of plus $E_0$, and, since the integral of amplitude and duration is a constant, the duration of the output will also be kept constant. The same effect may be accomplished by using a clamping arrangement at the input of the power winding. This is shown in dotted lines in Figure 20. In this case, diode $D_2$ will limit the amplitude of the voltage across the power winding to a value of minus $E_1$ which will maintain constant both the amplitude and duration of the output for the reason given before. It should be understood that only one of these clamping arrangements is needed.

In order to keep the output pulse constant in amplitude and duration, when a constant voltage power input is applied, the circuit shown in Figure 21 may be used. The constant voltage power pulse is applied through diode $D_1$ to the power winding while diode $D_2$ will clamp the lower end of the power winding to ground. The current, which is the maximum current expected, is caused to flow as shown through resistor $R_1$.

If the core is at minus $B_R$ when the power pulse is applied, the full power pulse voltage will appear across the power winding as the core travels from minus $B_R$ to plus $B_R$, and an output of constant amplitude and duration results. When the current from the power pulse equals the current flowing through $R_1$, the diode $D_2$ will break free, and the lower end of the power winding will look into the high impedance or $R_1$. The current from the power pulse will thus be limited to the value of the latter current, and there is no danger of overloading the power winding or the power pulse source.

If the core is at plus $B_R$ when the power pulse is applied, no voltage will appear across the power winding, and there will be no output. The current from the power pulse will immediately reach the value of the current flowing through $R_1$, and the value of the power pulse voltage will appear at terminal A. This circuit may, therefore, serve as both an amplifier and complementer: the amplifier output being taken across $R_L$ and the complementer output being taken at terminal A.

Figure 22 shows a method of interlacing signals in such a manner that the rate of transmission of information over one single line can be doubled. This means that, without any change in the speed of propagation, the time required for the transmission of a given quantity of information is cut into one half. To accomplish this effect, a pulse envelope system may be used, as illustrated in the timing diagram of Figure 22*a*. The timing pulses (TP) and power pulses (PP) are shown in relation to the input and output pulses. The members $A_1$ and $A_2$ are magnetic amplifiers as previously described. The timing pulses, $TP_1$ and $TP_2$, alternately gate the signals from the input into either amplifier $A_1$ or $A_2$. The power pulses, $PP_1$ and $PP_2$, operate the amplifiers in such a manner that $A_1$ and $A_2$ alternately produce outputs which are buffed into the output line. Figure 22*b* gives a schematic diagram of a two-channel interlace system.

It is to be noted that an interlace of more than two circuits could be used. Three, four or any desired number of gates, amplifiers and buffers could be connected in the same manner as the two circuits shown in Figure 22 are connected.

The circuit of Figure 22 may also be used for the purpose of rearranging the pulses in a group. The pulses are fed into the appropriate amplifiers, as determined by the TP's, and are fed out at the time determined by the PP's. Therefore, the output pulses could have a different array than the input pulses. With a proper arrangement of multiple outputs, an interlace device such as this can, furthermore, be used to take signals arriving on one input line and distribute them at the proper times, as determined by the timing and power pulses, to several output lines.

Figure 23 shows a method of using amplifiers for flip-flop effects. An input signal enters amplifier $A_1$ through buffer $B_1$. The signal is amplified and an output is obtained through buffer $B_2$. At the same time, amplifier $A_2$ is set by the output from amplifier $A_1$. During the next power period, amplifier $A_2$ feeds amplifier $A_1$ through the gate G and buffer $B_1$. The output of amplifier $A_2$ is buffed through buffer $B_3$ into the output. Thus, a steady output is obtained by buffing the outputs of amplifiers $A_1$ and $A_2$. Either one is always operating, and the flip-flop is set as long as either one operates. The circulating loop must be broken, if and when it is desired to restore the flip-flop, and the gate G is provided for this purpose. If a "restore" or inhibitory signal is applied to gate G at the time that amplifier $A_2$ is delivering the output, no further output will be obtained after the output delivered by amplifier $A_2$ has disappeared, and the flip-flop will have been restored. If, however, gate G is located at the input amplifier $A_2$ and the "restore" or inhibitory signal is applied when amplifier $A_2$ is delivering an output, the inhibition must last until amplifier $A_1$ has delivered its output, and the flip-flop will restore only after amplifier $A_1$ has completed its output. In order that the flip-flop might be restored as rapidly as possible, an inhibitory gate operated by the restore pulse could also be placed on the output line. For fastest operation, it would be desirable to have a restore gate at the input to amplifier $A_1$, the input to amplifier $A_2$ and the output. Figures 23*a* and 23*b* show a schematic diagram of this flip-flop arrangement and waveforms of the applied power waves, timing pulses, and blocking pulses, respectively.

The circuit illustrated in the block diagram of Figure 23*c* and the schematic diagram of Figure 23*d* differs from the circuit of Figures 23 and 23*a* insofar as only one amplifier is employed. Here any well-known pulse delay device may be used to delay an output pulse from the single amplifier for the period of the power pulse applied to this amplifier. At the end of the delay period, the output from the delay device is buffed into the output line and also placed on the input to the amplifier. Thus, a steady output is obtained following the application of an input or set signal, and this output is continued until a restore signal is applied to gate G to inhibit the output from the delay device from reaching the input to the amplifier.

Two other circuits may be used for flip-flop effects, as shown in Figures 23*e* and 23*g*. Both these circuits will allow the flip-flop to be set or restored with a single pulse that may occur during either signal period.

Figure 23*e* illustrates two three-winding amplifiers, with the set signal applied to both inputs in parallel. Since one or the other blocking pulse will always be at zero, an input during either signal period will always set one or the other amplifier, thus giving an output with the arrival of the next following power pulse. The output is returned to the common input through diode $D_2$ and will continue to set the alternate amplifiers with every pulse, thus giving a continuous output signal, since the two outputs are buffed together through diodes $D_5$ and $D_6$.

The restoring signal is buffed to the blocking pulses, so that a restoring input will maintain the blocking signal on both amplifiers. Thus neither amplifier can be set, either by the feedback signal or an input, and there will be no output. The restoring signal may be applied during either signal period, since it will always maintain the block on both amplifiers. The waveforms for this amplifier are illustrated in Figure 23*f*. The power pulses shown are current limited pulses, as in other amplifiers.

Figure 23*g* shows basically the same arrangement as Figure 23*e*, but for a center tapped transformer T which is to apply the blocking pulses to both amplifiers from a single supply source. The transformer has a voltage of 2E volts peak to peak on each side of the center tap, and since the center tap of the transformer is returned to 0 volts, the blocking voltage applied to each amplifier is plus E. The restoring voltage is applied to the center tap of the transformer and thus blocks both input circuits.

The power pulses for this flip-flop arrangement are current limited as they were for the previous flip-flop arrangement. The waveforms of this amplifier are shown in Figure 23*h*.

While specific embodiments have been described in detail to illustrate the principles of the invention, many modifications and variations for applying such principles in other arrangements, but which will not depart materially from the spirit of the invention, will be apparent to those skilled in the art.

What is claimed, is:

1. In combination, a core of ferromagnetic material, at least one electric winding having a plurality of terminals associated with said core, at least one source of periodically recurring power pulses and blocking pulses connected to at least one of said winding terminals, one source of selectively applied electric impulses connected to one of said winding terminals, and at least one load circuit connected to a predetermined one of said winding terminals and arranged in parallel relationship to an electric winding associated with said core in regard to said source of periodically recurring power pulses, whereby output signals are produced through changes in flux density in said core which follow the path of the hysteresis loop in the high permeability region.

2. The combination according to claim 1 comprising a unilateral conductor connected between said load circuit and its associated winding terminal.

3. The combination according to claim 1 comprising a unilateral conductor connected between said source of periodically recurring power pulses and its associated winding terminal.

4. The combination according to claim 1 comprising a unilateral conductor connected between said source of selectively applied electric impulses and its associated winding terminal.

5. The combination according to claim 1 in which said periodically recurring power pulses and blocking pulses are alternately positive and negative electric impulses, respectively.

6. The combination according to claim 1 in which a constant current source is connected between at least one of said sources of periodically recurring power pulses and its associated winding.

7. The combination according to claim 1 in which a constant current source is connected in series with said source of selectively applied electric impulses and its associated winding.

8. In combination, a core of ferromagnetic material, only one electric winding having a plurality of terminals associated with said core, a source of periodically recurring electric impulses connected to a first terminal of said winding, a source of selectively applied electric impulses connected to a second terminal of said winding, and a load circuit connected to a load terminal of said winding and arranged in parallel relationship to the electric winding associated with said core in regard to the source of said periodically recurring electric impulses.

9. The combination according to claim 8 comprising a unilateral conductor connected between said load circuit and said load terminal of said winding.

10. The combination according to claim 8 comprising a unilateral conductor connected between said source of periodically recurring impulses and said first terminal of said winding.

11. The combination according to claim 8 comprising a unilateral conductor connected between said source of selectively applied electric impulses and said second terminal of said winding.

12. The combination according to claim 8 in which the pulses from said source of selectively applied electric impulses are applicable during the time intervals between pulses of a first polarity from said source of periodically recurring electric impulses.

13. The combination according to claim 8 in which the pulses from said source of periodically recurring electric impulses consist alternately of power pulses and blocking pulses, said blocking pulses being of opposite polarity in reference to said power pulses and occurring during the time intervals reserved for the pulses from said source of selectively applied electric impulses.

14. The combination according to claim 13 in which the pulses from said source of selectively applied electric impulses are of opposite polarity in reference to said blocking pulses.

15. The combination according to claim 13 further comprising a source of constant current connected to the junction of said source of periodically recurring electric impulses and said first terminal of said winding.

16. The combination according to claim 15 comprising a unilateral conductor interposed between said source of periodically recurring electric impulses and said first terminal of said winding.

17. The combination according to claim 8 further comprising a source of constant current connected to the junction of said source of selectively applied electric impulses and said second terminal of said winding.

18. The combination according to claim 17 comprising a capacitor and a first and a second unilateral conductor, said capacitor and said first unilateral conductor being interposed in series between said source of selectively applied electric impulses and said second terminal of said winding, and said second unilateral conductor being interposed between said second source of constant current and the junction of said capacitor and said first unilateral conductor.

19. In combination, a core of ferromagnetic material, only one electric winding having a plurality of terminals associated with said core, a plurality of sources of electric impulses connected, respectively, to at least two terminals of said winding and a load circuit connected to one of the terminals of said winding and arranged in parallel relationship to the winding associated with said core in regard to one of said sources of electric impulses.

20. The combination according to claim 8 in which said load terminal and said first terminal are the same.

21. The combination according to claim 8 further comprising a source of constant current connected to the junction of said source of periodically recurring electric impulses and said first terminal of said winding and a second source of constant current connected to the junction of said source of selectively applied electric impulses and said second terminal of said winding.

22. The combination according to claim 21 in which the currents from said two constant current sources are of opposite polarities.

23. In combination, a core of ferromagnetic material, electric winding means coupled to said core having a plurality of terminals associated therewith, at least one source of periodically recurrent power pulses and blocking pulses connected to at least one of said winding terminals, a source of selectively applied electric impulses connected to one of said terminals of said winding means, said blocking pulses isolating at least a portion of the source of power pulses from the source of selectively applied electric impulses, load means connected to a predetermined one of said winding terminals and arranged in parallel relationship to a portion of the electric winding means associated with said core in regard to said source of periodically recurring power pulses, whereby output signals are produced across said load means through changes in flux density in said core which follow the path of the hysteresis loop of said core in the high permeability region.

24. In combination, a core of ferromagnetic material having two stable states of magnetic remanence, an electric winding means coupled to said core, means for receiving selectively applied signals coupled to said winding means for driving said core during one interval of time toward one of said states of remanence, means for receiving power pulses coupled to said winding means for driving said core during another interval of time toward the other of said states of remanence, means for receiving blocking pulses coupled to said winding means, said last named means responding to said blocking pulses for isolating at least a portion of the means for receiving power pulses from said means for receiving selectively applied signals, and a load circuit directly connected to said means for receiving power pulses and said winding means and arranged in parallel relationship to a portion of said winding means.

25. In combination, a core of ferromagnetic material having two stable states of magnetic remanence, first and second electric windings coupled to said core, first means for supplying power pulses connected to one end of said first winding for driving said core during one interval of time toward one of said states of remanence, load means directly connected to said means for supplying power pulses and to said one end of said first winding and arranged in parallel relationship to said first winding, second means for supplying signal pulses connected to one end of said second winding for driving said core during another interval of time toward one of said states of remanence, and means including a blocking pulse source coupled to one of said windings for isolating said first and second means from each other.

26. In combination, a core of ferromagnetic material having two stable states of magnetic remanence, first and second electric windings coupled to said core, means for supplying power pulses connected to one end of said first winding, load means directly connected to said means for supplying power pulses and to said one end of said first winding and arranged in parallel relationship to said first winding, means for supplying signal pulses connected to one end of said second winding for driving said core during one interval of time toward one of said states of remanence, a constant current source connected to said first winding and said means for supplying power pulses, and a unilateral conductor connected between said means for supplying power pulses and said first winding, wherein the absence of said power pulses causes current from said constant current source to flow to said means for supplying power pulses and the presence of said power pulses causes current from said constant current source to flow to said first winding to drive said core during another interval of time toward one of said states of remanence.

27. In combination, a core of ferromagnetic material having two stable states of magnetic remanence, first and second electric windings coupled to said core, means for supplying power pulses connected to one end of said first winding for driving said core during one interval of time toward one of said states of remanence, load means directly connected to said means for supplying power pulses and to said end of said first winding and arranged in parallel relationship to said first winding, means for supplying signal pulses connected to one end of said second winding for driving said core during another interval of time toward one of said states of remanence, a unilateral conductor connected to the other end of said first winding and a source of blocking pulses connected to said unilateral conductor, said source of blocking pulses supplying impulses during said interval of time for said signal pulses to thereby prevent current from passing through said unilateral conductor and said first winding.

28. In combination, a core of ferromagnetic material having two stable states of magnetic remanence, first and second electric windings coupled to said core, means for supplying power pulses connected to one end of said first winding for driving said core during one interval of time toward one of said states of remanence, load means directly connected to said means for supplying power pulses and to said one end of said first winding and arranged in parallel relationship to said first winding, means for supplying signal pulses connected to one end of said second winding for driving said core during another interval of time toward one of said states of remanence, a unilateral conductor connected to the other end of said second winding and a source of blocking pulses connected to said unilateral conductor, said source of blocking pulses supplying impulses concurrently with pulses from said means for supplying power pulses to thereby prevent current from passing through said unilateral conductor and said second winding.

29. In combination, a core of ferromagnetic material having two stable states of magnetic remanence, first, second and third electric windings coupled to said core, a source of power pulses connected to one end of said first winding, a load means connected in parallel with said second winding, a source of signal pulses connected to one end of said third winding for driving said core during one time interval toward one of said states of remanence, a constant current source connected to said one end of the first winding and said source of power pulses, and a first unilateral conductor connected between said source of power pulses and said one end of the first winding wherein the absence of power pulses causes current from said constant current source to flow into said source of power pulses and the presence of said power pulses causes current from said constant current source to flow to said first winding to drive said core during another interval of time toward one of said states of remanence.

30. In combination, a core of ferromagnetic material having two stable states of magnetic remanence, first, second and third electric windings coupled to said core, a source of power pulses connected to one end of said first winding, a load means connected in parallel with said second winding, a source of signal pulses connected to one end of said third winding, a constant current source connected to said one end of the first winding and said source of power pulses, a first unilateral conductor connected between said source of power pulses and said one end of the first winding wherein the absence of power pulses causes current from said constant current source to flow into said source of power pulses and the presence of said power pulses causes current from said constant current source to flow to said first winding to drive said core during one interval of time toward one of said states of remanence, another constant current source connected to said one end of said third winding and said source of signal pulses, and a second unilateral conductor connected between said source of signal pulses and said third winding wherein the absence of signal pulses causes current from said another constant current source to flow into said source of signal pulses and the presence of said signal pulses causes current from said another constant current source to flow to said third winding to drive said core during another interval of time toward one of said states of remanence.

31. In combination, a core of ferromagnetic material having two stable states of magnetic remanence, first, second and third electric windings coupled to said core, a source of power pulses connected to one end of said first winding, a load means connected in parallel with said second winding, a source of signal pulses connected to one end of said third winding for driving said core during one time interval toward one of said states of remanence, a constant current source connected to said one end of the first winding and said source of power pulses, a first unilateral conductor connected between said source of power pulses and said one end of the first winding wherein the absence of power pulses causes current from said constant current source to flow into said source of power pulses and the presence of said power pulses causes current from said constant current source to flow to said first winding to drive said core during another interval of time toward one of said states of remanence, a second unilateral conductor connected to the other end of said third winding and a source of blocking pulses connected to the non winding end of said second unilateral conductor supplying pulses concurrently with, but of opposite polarity to the pulses supplied from said power pulse source.

32. In combination, a core of ferromagnetic material having two stable states of magnetic remanence, first, second and third electric windings coupled to said core, a source of power pulses connected to one end of said first winding for driving said core during one interval of time toward one of said states of remanence, a load means connected in parallel with said second winding, a source of signal pulses, a source of clock pulses connected to one end of said third winding for driving said core during another time interval toward one of said states of remanence, a constant current source connected in parallel with said third winding and said source of power pulses and controlled by said source of clock pulses, a first unilateral conductor connected between said one end of the third winding and said source of signal pulses, said clock pulses consisting alternately of blocking pulses and signal supply pulses, the blocking pulses being of the same polarity as and occurring simultaneously with the pulses from said power pulse source, and the signal supply pulses occurring during the time intervals reserved for the pulses from said signal pulse source and having the same polarity as the pulses from said signal pulse source.

33. In combination, a core of ferromagnetic material having two stable states of magnetic remanence, first, second and third electric windings coupled to said core, a source of power pulses connected to one end of said first winding for driving said core during one interval of time toward one of said states of remanence, a load means connected in parallel with said second winding, a source of signal pulses connected to one end of said third winding for driving said core during another time interval toward the other one of said states of remanence, a unilateral conductor connected in series between said signal pulse source and said one end of said third winding, and a relatively low impedance source of blocking pulses connected to the other end of said third winding, the pulses from said signal pulse source being of opposite polarity in reference to the pulses from said power pulse source and selectively applied during the time intervals between the power pulses, said blocking pulses being of the same polarity as the signal pulses, but occurring simultaneously with the power pulses.

34. In combination, a core of ferromagnetic material having two stable states of magnetic remanence, first, second and third electric windings coupled to said core, a source of power pulses connected to one end of said first winding, a load means connected in parallel with said second winding, a source of signal pulses connected to one end of said third winding, a constant current source connected to said one end of the first winding and said source of power pulses, a first unilateral conductor connected between said source of power pulses and said one end of the first winding wherein the absence of power pulses causes current from said constant current source to flow into said source of power pulses and the presence of said power pulses causes current from said constant current source to flow to said first winding to drive said core during one interval of time toward one of said states of remanence, another constant current source connected to said one end of said third winding and said source of signal pulses, a second unilateral conductor connected between said source of signal pulses and said third winding wherein the absence of signal pulses causes current from said another constant current source to flow into said source of signal pulses and the presence of said power pulses causes current from said another constant current source to flow to said third winding to drive said core during another interval of time toward one of said states of remanence, first and second sources of blocking pulses, said first source of blocking pulses being connected to the end of said first winding which is not connected to said source of power pulses, and the second source of blocking pulses being connected to the end of said third winding which is not connected to said source of signal pulses, the pulses from said first source of blocking pulses being of the same polarity as the signal pulses and being applied during the time periods reserved for the signal pulses, and the pulses from the second source of blocking pulses being of the same polarity as and being applied simultaneously with the power pulses.

35. In combination, a core of ferromagnetic material having two stable states of magnetic remanence, first, second and third electric windings coupled to said core, a source of power pulses connected to one end of said first winding for driving said core during one interval of time toward one of said states of remanence, a load means connected in parallel with said second winding, a gate circuit connected at its output to one end of said third winding, a source of clock pulses connected to the input of said gate circuit for driving said core during another time interval toward one of said states of remanence, and a source of signal pulses connected to the input of said gate circuit for inhibiting the passage of pulses from said source of clock pulses through said gate circuit.

36. In combination, a core of ferromagnetic material having two stable states of magnetic remanence, first and second electric windings coupled to said core, means for supplying power pulses connected to one end of said winding having negative and positive polarity portions, load means directly connected to said means for supplying power pulses and to said first winding and arranged in parallel relationship to said first winding, means for supplying signal pulses connected to one end of said second winding for driving said core during one interval of time toward one of said states of remanence, a constant current source connected to said first winding and said means for supplying power pulses, and a unilateral conductor connected between said means for supplying power pulses and said first winding, wherein the presence of the portions of said power pulses of one polarity causes current from said constant current source to flow to said first winding to drive said core during another interval of time toward one of said states of remanence and the presence of the portions of said power pulses of the other polarity causes current to cease flowing from said constant current source to said first winding and to instead flow from said constant current source to said means for supplying said power pulses.

References Cited in the file of this patent

UNITED STATES PATENTS

| | | |
|---|---|---|
| 2,375,609 | Zuhlke | May 8, 1945 |
| 2,652,501 | Wilson | Sept. 15, 1953 |
| 2,653,254 | Spitzer | Sept. 22, 1953 |
| 2,654,080 | Browne | Sept. 29, 1953 |
| 2,673,337 | Avery | Mar. 23, 1954 |

OTHER REFERENCES

Publication I Proc. of IRE, April 1951 pp. 401–407.

Publication II Proc. of IRE, June 1950 pp. 626–629.

Publication III, IRE National Convention Record March 23–26, 1953 (pp. 38–42).

Notice of Adverse Decision in Interference

In Interference No. 90,676 involving Patent No. 2,892,998, J. P. Eckert, Jr., and T. H. Bonn, Signal translating device, final judgment adverse to the patentees was rendered Aug. 31, 1962, as to claim 19.

[*Official Gazette February 5, 1963.*]